United States Patent
Leclerc et al.

(10) Patent No.: US 9,737,864 B2
(45) Date of Patent: Aug. 22, 2017

(54) METHOD AND SYSTEM FOR PRODUCING CALIBRATED MICROCAPSULES

(75) Inventors: Eric Leclerc, Margny les Compiegne (FR); Anne-Virginie Salsac, Choisy-au-Bac (FR); Dominique Barthes-Biesel, Compiegne (FR); Thi Xuan Chu, Compiegne (FR)

(73) Assignees: UNIVERSITE TECHNOLOGIE DE COMPIEGNE-UTC, Compiegne (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 166 days.

(21) Appl. No.: 14/113,210

(22) PCT Filed: Apr. 23, 2012

(86) PCT No.: PCT/EP2012/057350
§ 371 (c)(1),
(2), (4) Date: Mar. 17, 2014

(87) PCT Pub. No.: WO2012/143546
PCT Pub. Date: Oct. 26, 2012

(65) Prior Publication Data
US 2014/0191430 A1    Jul. 10, 2014

(30) Foreign Application Priority Data
Apr. 22, 2011 (FR) ..................... 11 53526

(51) Int. Cl.
  *B01J 13/00*   (2006.01)
  *B01J 13/14*   (2006.01)
  *G05D 7/06*    (2006.01)
(52) U.S. Cl.
  CPC ............. *B01J 13/00* (2013.01); *B01J 13/14* (2013.01); *G05D 7/0694* (2013.01)

(58) Field of Classification Search
None
See application file for complete search history.

(56) References Cited

U.S. PATENT DOCUMENTS

| 2010/0187705 A1* | 7/2010 | Lee ...................... B01J 13/14 264/5 |
| 2011/0014297 A1* | 1/2011 | Lee ...................... A61K 9/0009 424/491 |

OTHER PUBLICATIONS

Database WPI Week 200722, Thomson Scientific, London, GB; AN 2007-214621 XP002665063 & JP2007044692A (Japan Sci & Tech. Agency), Feb. 22, 2007. 17 pages.

(Continued)

*Primary Examiner* — Jeffrey Washville
(74) *Attorney, Agent, or Firm* — Blakely Sokoloff Taylor & Zafman LLP (57) ABSTRACT

The present invention relates to a method for producing microcapsules having a calibrated diameter and at least one parameter characteristic of the mechanical properties of an equally calibrated microcapsule, characterized in that the method includes the steps of: producing microcapsules by means of injection into a microsystem (10) of three fluids (f1, f2, f3); deforming the microcapsules by means generating a flow within a capillary tube (20); observing and acquiring the outline of at least one deformed microcapsule observed by an optical acquisition means (30); comparing the acquired outline with outlines from a collection of reference microcapsule outlines; determining the diameter and said at least one parameter characteristic of the mechanical properties of the observed microcapsule; and modifying the flow rates (Q1, Q2, and/or Q3) of the fluids (f1, f2, f3). The present invention also relates to a system for producing calibrated microcapsules.

22 Claims, 8 Drawing Sheets

(56) References Cited

OTHER PUBLICATIONS

Database WPI Week 200721, Thomson Scientific, London, GB; AN 2007-203697 XP002665064 & JP2007038223A (Japan Sci & Tech. Agency), Feb. 15, 2007, 19 pages.
Database WPI Week 200461, Thomson Scientific, London, GB; AN 2004-628588 XP002665065 & JP2004237177A (Japan Sci & Tech. Agency), Aug. 26, 2004. 22 pages.
Yeh et al. "Using a T-Junction Microfluidic Chip for Monodisperse Calcium Alginate Microparticles and Encapsulation of Nanoparticles." Sensors and Actuators A, vol. 151, No. 2. Elsevier Sequoia S.A., Lausanne, Ch. (Apr. 29, 2009). pp. 231-236. 7 pages.
Yang et al. "Using a Cross-Flow Microfluidic Chip and External Crosslinking Reaction for Monodisperse TPP-Chitosan Microparticles." Sensors and Actuators B, vol. 124, No. 2. Elsevier S.A., Switzerland (Jun. 7, 2007). pp. 510-516. 7 pages.

\* cited by examiner

METHOD AND SYSTEM FOR PRODUCING CALIBRATED MICROCAPSULES

GENERAL TECHNICAL FIELD

The present invention relates to the field of microencapsulation.

STATE OF THE ART

Microencapsulation is a method by which a product is enclosed in generally spherical micrometric capsules. These microcapsules are constituted of a membrane which temporarily isolates the contained product from the external environment.

Depending on the encapsulated molecules, numerous applications exist in the fields of agriculture (fertilisers), health (medicines), cosmetics (creams) etc. In the textile industry, this method makes it possible for example to imprison a fragrance or a cosmetic active ingredient being deposited on the skin thanks to microcapsules localised in the very fibres of an item of clothing.

In the health field, microcapsules may for example be used in order to achieve the delivery of a precise quantity of active ingredient, which is released in a controlled manner in the body. These microparticles may in particular be injected intra-muscularly or directly into a tissue. The release of the medicine may last several months.

Microcapsules enable in fact a wide variety of release. This release may be sudden, in the case of a mechanical destruction of the membrane. Thus, certain communication material supports, for example advertisements for a fragrance, have an "olfactory scratch zone", said zone being covered with microcapsules containing drops of the fragrance. On scratching, the microcapsules are crushed and the fragrance is released.

Alternatively, the membrane may remain present throughout the release of the contents, this taking place by progressive diffusion through the membrane particularly for an encapsulation of medicines with controlled release.

In this latter case, the choice of the mechanical and chemical properties of the membrane is fundamental. Depending on the desired release kinematics, and depending on the medium in which the microcapsules are intended to be used, it is necessary to adapt the volume of the microcapsules, the material of the membrane, its thickness, its resistance, its rigidity, etc.

To form such microcapsules with controlled release, cross-linking is sometimes employed. Cross-linking is the formation of a three-dimensional structure, solid and virtually insoluble, by polymerisation of precursors at the interface between a solution and drops in suspension of the fluid to be microencapsulated, this three-dimensional structure constituting the membrane.

In cross-linking referred to as interfacial, certain cross-linking reagents may be contained in the solution, whereas the other reagents are in the drops in suspension—said drops being intended to be encapsulated by the membranes that will be created by cross-linking. At the interface between the solution and the drops, the reagents meet and react with each other.

Alternatively, the cross-linking may be brought about in-situ for example under the effect of heat, under the effect of an irradiation, or simply in the presence of a catalyst.

By controlling the cross-linking time, the thickness of the membrane and the pore density are controlled.

Known methods of microencapsulation consist in choosing a solution (for example a biocompatible fatty ester) not miscible with the fluid to be encapsulated, and emulsifying them in vessels. The fluid to be encapsulated is then dispersed in the solution in the form of microdroplets. The cross-linking is then implemented. Encapsulated microdroplets are finally recovered, the size and the mechanical properties of which are not nevertheless uniform.

By sieving, the too large microcapsules can be eliminated. But the mechanical properties of the remaining microcapsules and in particular the thickness of their membrane remain undetermined. Moreover, it is not possible to eliminate too small microcapsules.

Figure 1:
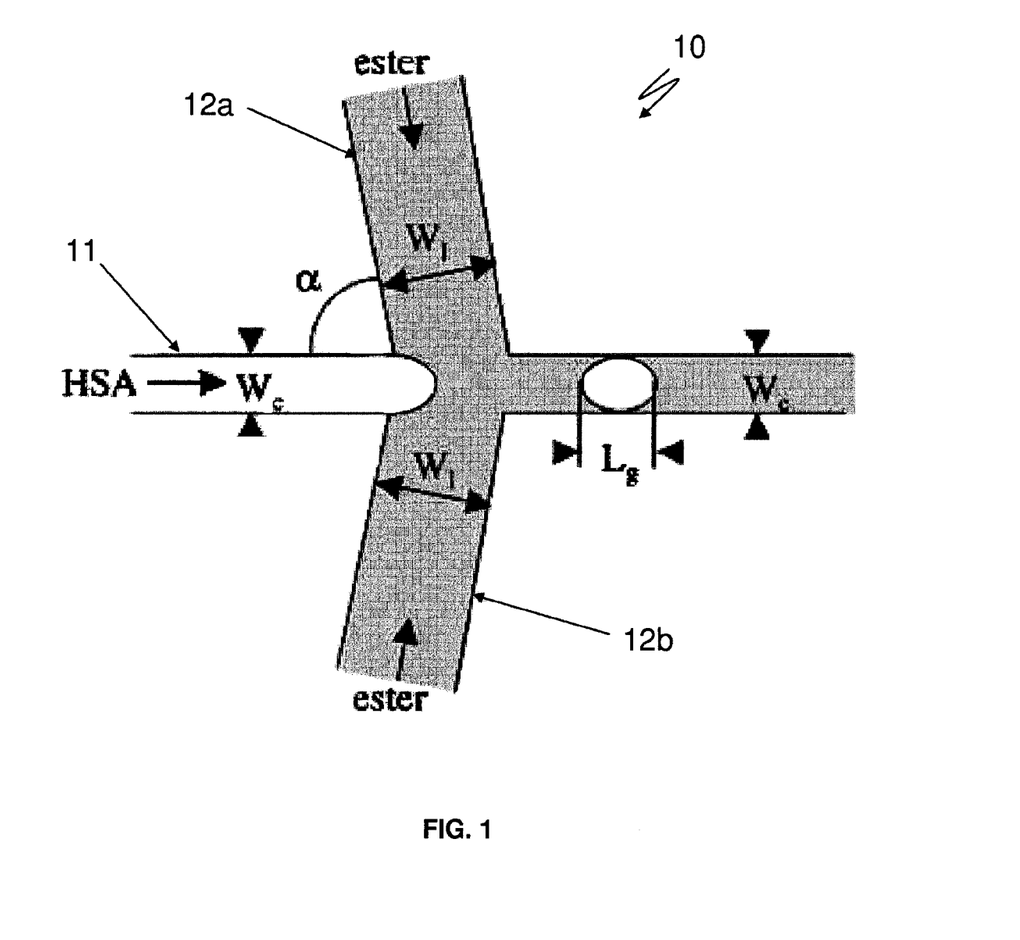
FIG. 1 described previously is a diagram of a known microsystem enabling a production of microdroplets of uniform size.

The document "Flow of two immiscible liquids with to low viscosity in Y shaped microfluidic systems: effect of geometry" (P. He, D. Barthès-Biesel and E. Leclerc, Microfluidics and Nanofluidics, 24 Dec. 2009) describes a Y-shaped microsystem 10, represented in FIG. 1, enabling the one by one formation of is microdroplets of uniform size. The fluid to be encapsulated f1 is injected into the axis of the Y (central microchannel 11), and the second non miscible fluid f2 is injected laterally into the branches of the Y (lateral microchannels 12).

Figure 2A:
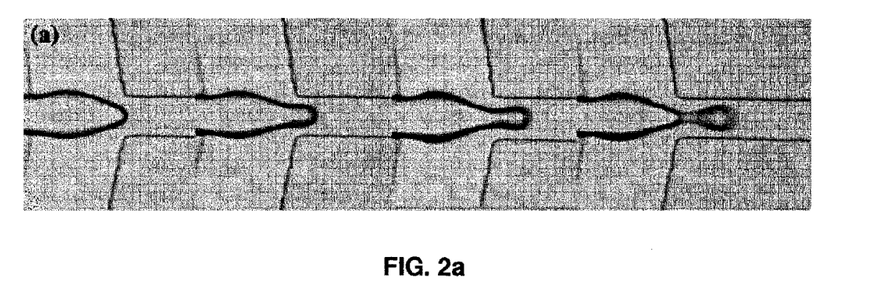
FIGS. 2a-b described previously represent successive phases of formation of microdroplets in two known microsystems with different operating parameters.

By virtue of the increase of shear forces compared to surface tension forces around the first fluid f1 during its progression in the central microchannel 11, microdroplets detach at regular intervals as may be seen in FIG. 2a. This figure represents an experiment carried out in a microsystem analogous to that of FIG. 1, for which the fluid f1 is a 20% solution of human albumin (HSA) in a buffer phosphate solution at a pH of 9.8, and the fluid f2 is a biocompatible fatty ester known as Dragoxat® (or 2-ethylhexyl 2-ethylhexanoate). The widths Wc and W1 of the channels are respectively 100 and 200 μm.

Figure 2B:
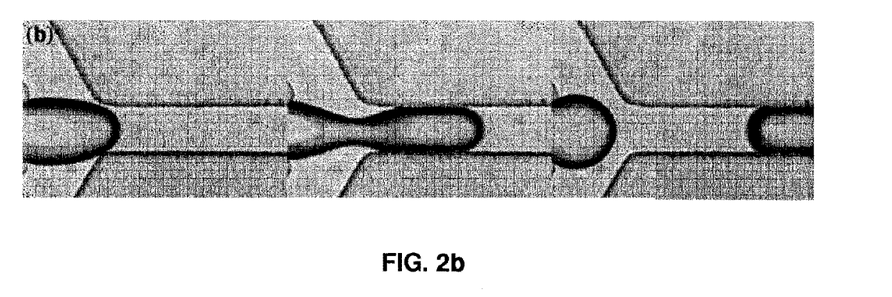

Moreover, the relative variation of the injection flow rates Q1 and Q2 respectively of the first fluid f1 and of the second fluid f2 make it possible to modify the size of the microdroplets. Thus, if Q1 is increased with Q2 constant, more voluminous microdroplets are obtained as may be seen in FIG. 2b (same fluids, double flow rate Q1).

This device only makes it possible to obtain microdroplets of uniform size and not microcapsules. To form microcapsules, the membrane must still be generated during an additional step of cross-linking which leads to the same difficulties of appreciation of its physical properties. Moreover, the laws that link the flow rates of the fluids, the sections of the channels and the angles with the diameter of microdroplets produced in such a microsystem remain particularly complex and it will be not very obvious to choose directly the correct parameters that will make it possible to obtain microdroplets of the desired size.

For all these reasons, known microencapsulation methods and systems still need to be improved.

DESCRIPTION OF THE INVENTION

The present invention aims to enable a production of calibrated microcapsules, both with regard to their diameter and their mechanical properties.

A subsidiary aim of the invention is to enable a rapid, inexpensive and reliable industrial production of microcapsules.

The present invention thus relates to a method for producing microcapsules having a calibrated diameter and at least one calibrated parameter characteristic of the mechanical properties of a microcapsule, method characterised in that it includes the steps of:

producing microcapsules by injecting into a microsystem:
  a first fluid (f1) to be encapsulated, at a first flow rate (Q1),
  a second fluid (f2) not miscible with the first fluid, at a second flow rate (Q2), and
  a third fluid (f3) containing a precursor of the microcapsule membrane, at a third flow rate (Q3);
deforming the microcapsules by generating a flow of said microcapsules in a capillary, the diameter of the capillary being of the same order of magnitude as the calibrated diameter;
observing and acquiring the outline of at least one deformed microcapsule observed by optical acquisition means;
comparing by data processing means the acquired outline with outlines from a collection of reference microcapsule outlines, the diameter and at least one parameter characteristic of the mechanical properties of a reference microcapsule being known for each to reference microcapsule;
determining the diameter and the value of the at least one parameter characteristic of the mechanical properties of the observed microcapsule by the data processing means;
modifying the flow rates (Q1, Q2, and/or Q3) of the fluids (f1, f2, f3) if the difference between:
  the diameter of the determined observed microcapsule and an optimal diameter, and/or
  the determined value of the at least one parameter characteristic of the mechanical properties of the observed microcapsule and an optimal value of the at least one parameter characteristic of the mechanical properties of a microcapsule, is above a threshold predetermined.

According to other advantageous and non-limiting characteristics:
the at least one parameter characteristic of the mechanical properties of a microcapsule is the modulus of elasticity of the membrane of the microcapsule;
the at least one parameter characteristic of the mechanical properties of a reference microcapsule is the capillary number associated with the reference microcapsule;
said predetermined threshold is 10% for the difference between the diameter of the determined observed microcapsule and the optimal diameter, and 30% for the difference between the determined value of the at least one parameter characteristic of the mechanical properties of the observed microcapsule and the optimal value of the at least one parameter characteristic of the mechanical properties of a microcapsule;
the microsystem comprises a central microchannel, a first set of lateral microchannels and a second set of lateral microchannels, the first fluid (f1) being injected into the central microchannel, the second fluid (f2) being injected into the first set of lateral microchannels, the third fluid (f3) being injected into the second set of lateral microchannels;
each microchannel of the first set of lateral microchannels and/or of the second set of lateral microchannels intersects the central microchannel with a same angle comprised between 45° and 90°;
the second non miscible fluid (f2) is a biocompatible fatty ester;
the precursor of the microcapsule membrane contained in the third fluid (f3) is a cross-linking agent;
the microsystem comprises a cross-linking coil extending the microchannel;
the cross-linking is obtained by irradiation of the microdroplets in contact with the fluid (f3) by an infrared beam, an ultraviolet beam, or an electron beam;
the microsystem is made of transparent solidified polydimethylsiloxane;
the capillary is a glass tube of cylindrical section;
the capillary is inserted inside the central microchannel;
the capillary has an internal diameter comprised between 25 and 150 µm, an external diameter comprised between 300 and 500 µm, and a length comprised between 10 and 100 mm;
a reservoir for storing microcapsules is placed at the outlet of the capillary;
the step of acquiring the outline of at least one deformed microcapsule comprises the taking of at least one photograph of said microcapsule by the optical acquisition means, the acquired outline being constituted of a plurality of points materialising the membrane of the microcapsule placed on said photograph by the data processing means;
the step of acquiring the outline of at least one deformed microcapsule comprises the successive taking of at least two photographs of the microcapsule by the optical acquisition means, said two photographs being compared by the data processing means in order to measure the flow speed in the capillary of the observed microcapsule, said speed being taken into account during the step of comparing the acquired outline with the outlines from a collection of reference microcapsule outlines;
the diameter of the observed microcapsule is directly calculated from the acquired outline, and wherein the step of comparing the acquired outline with a collection of deformed reference microcapsule outlines by said capillary consists in the to superposition of the plurality of points acquired with each deformed reference microcapsule outline having a diameter similar to the calculated diameter of the observed microcapsule, the value of the at least one parameter characteristic of the mechanical properties of the observed microcapsule being determined by the data processing means from that associated with the reference microcapsule(s) having a diameter similar to the calculated diameter of the observed microcapsule whose outline comes nearest to said plurality of points;
the step of comparing the acquired outline with a collection of reference microcapsule outlines deformed by said capillary consists in the superposition of the plurality of points acquired with each deformed reference microcapsule outline, the diameter and the value of the at least one parameter characteristic of the mechanical properties of the observed microcapsule being determined by the data processing means from those associated with the reference microcapsule(s) whose outline comes nearest to said plurality of points.
the optical acquisition means comprise an inverted microscope and a high speed CCD camera;
the outline acquisition step is implemented for each microcapsule produced by the microsystem;
the reference microcapsule outlines are outlines acquired beforehand by the optical acquisition means, the reference microcapsules being deformed by flow in the capillary.

A second aspect of the invention relates to a system of producing calibrated microcapsules, characterised in that it comprises:
  a microsystem;

a capillary;

optical acquisition means;

data processing means;

the microsystem being adapted to produce microcapsules from a first fluid (f1) to be encapsulated injected at a first flow rate (Q1), a second fluid (f2) not miscible with the first fluid injected at a second flow rate (Q2) and a third fluid (f3) containing a precursor of the microcapsule membrane injected at a third flow rate (Q3);

the system being able to implement a method according to the first aspect of the invention.

PRESENTATION OF FIGURES

Other characteristics and advantages of the present invention will become clearer on reading the description that is given hereafter of a preferential embodiment. This description will be given with reference to the appended drawings in which:

FIGS. 5a-f represent various outlines of deformed microcapsules;

FIGS. 8a-d are four graphs linking a quantity representative of the outline of a deformed microcapsule with the parameters of the microcapsule.

DETAILED DESCRIPTION

Figure 4:
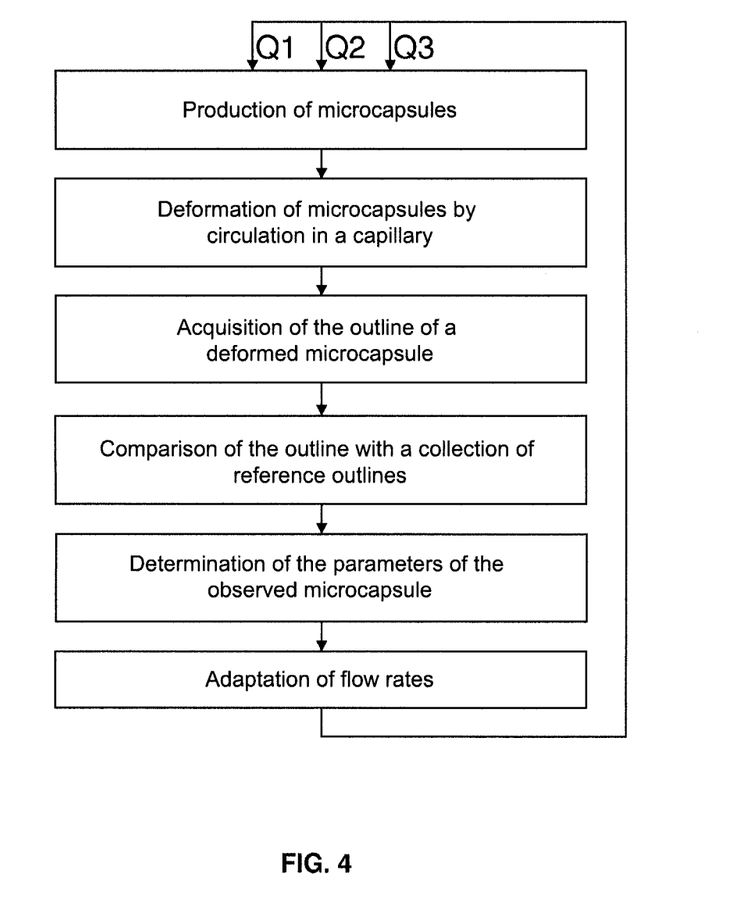
FIG. 4 is a diagram representing the steps of an embodiment of a method for producing microcapsules according to an aspect of the invention.
Figure 5A:
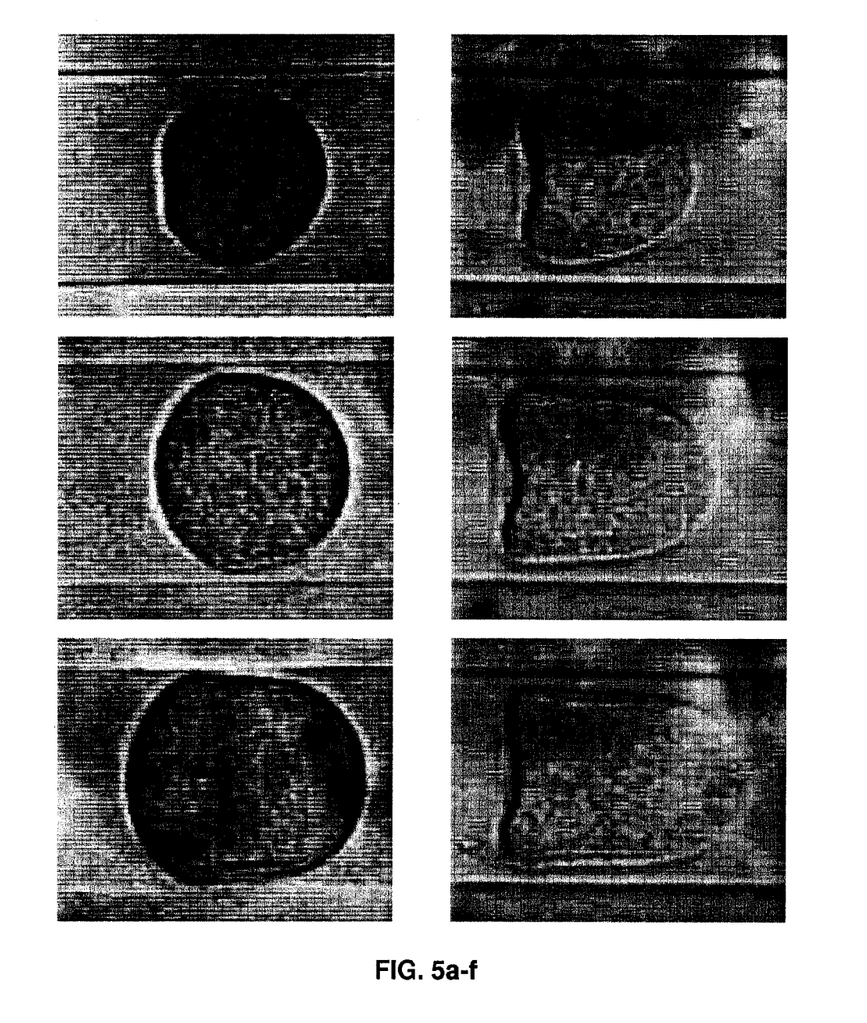

With reference to FIG. 4, the method for producing microcapsules having a calibrated diameter and at least one calibrated parameter characteristic of the mechanical properties of a microcapsule according to the invention comprises six successive steps.

Calibrated is taken to mean complying with a defined optimal value, the calibre, optionally with a certain tolerance. For example by calibrating the diameter to 100 µm±5%, (in other words the optimal value is 100 µm) the microcapsules produced will have a diameter between 95 and 105 µm. This tolerance is adjustable as will be seen hereafter.

Production of Microcapsules

The first step is the production of microcapsules itself, the microcapsules produced at the initiation of the method nevertheless not yet being calibrated. In fact, as explained previously, it is not really obvious to choose directly the right parameters that will make it possible to obtain microdroplets of the desired size and having the desired mechanical properties. The method according to the invention proposes initiating the production of microcapsules by firstly choosing arbitrarily these parameters, then by adjusting them during posterior steps such that after a short transitory period of adaptation the microcapsules produced are calibrated.

The step of producing microcapsules thus consists of the injection into a microsystem 10 of:

a first fluid f1 to be encapsulated, at a first flow rate Q1, a second fluid f2 not miscible with the first fluid, at a second flow rate Q2, and a third fluid f3 containing a precursor of the microcapsule membrane, at a third flow rate Q3;

Numerous architectures of microsystem 10 are possible. Advantageously, a microsystem 10 is chosen comprising the microsystem of formation of droplets described previously and represented by FIG. 1, in other words a microsystem 10 comprising a central microchannel 11, a first set of lateral microchannels 12 and a second set of lateral microchannels 13, the first fluid f1 being injected into the central microchannel 11, the second fluid f2 being injected into the first set of lateral microchannels 12, and the third fluid f3 being injected into the second set of lateral microchannels 13.

Figure 3:
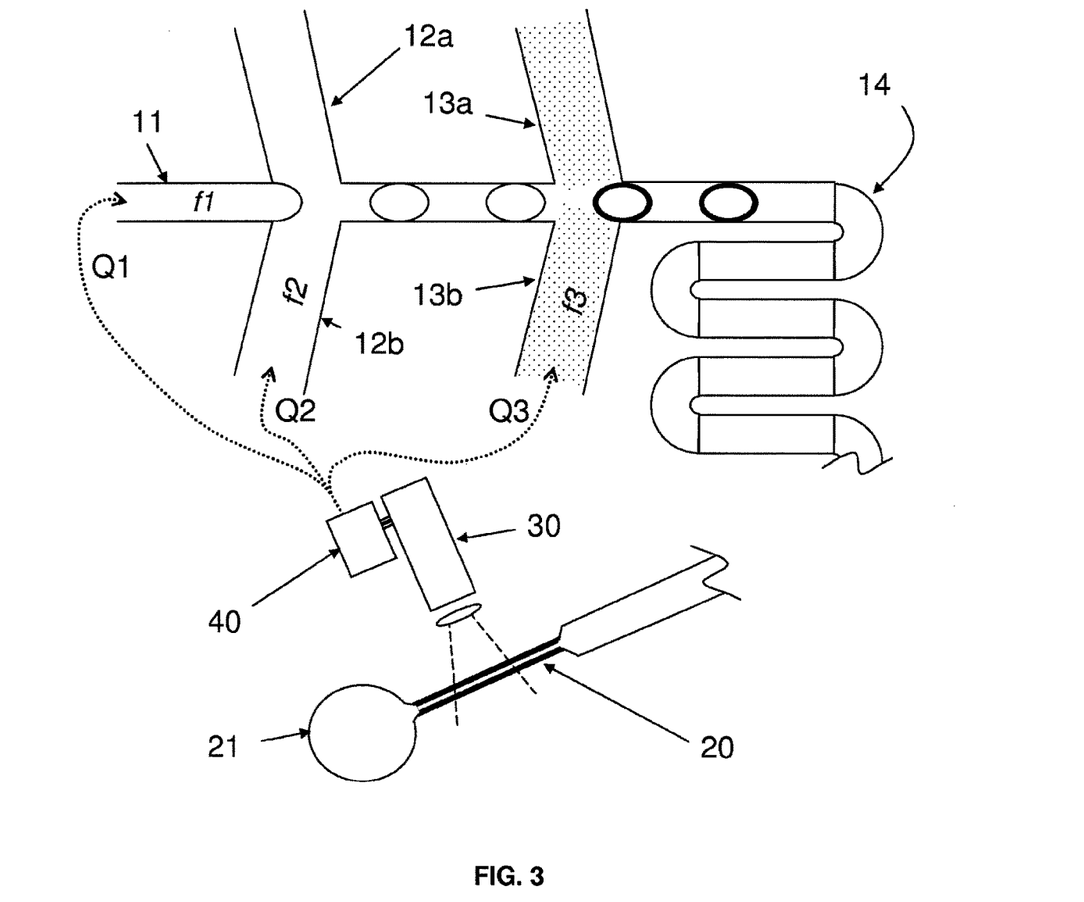
FIG. 3 is a top view of an embodiment of a system of producing microcapsules according to an aspect of the invention.

This particularly preferred microsystem 10 is "double Y-shaped" as represented in the overall view of the system of FIG. 3. In other words, each microchannel of the first set of lateral microchannels 12 and/or the second set of lateral microchannels 13 intersects the central microchannel 11 with a same angle comprised between 45° and 90°. The Y geometry has the advantage of maintaining the fluid to be encapsulated f1 centred in the central microchannel 11. Conversely, T junctions mean that the fluid impacts a wall opposite the central microchannel 11 before stabilising its trajectory.

As mentioned previously, the second non miscible fluid f2 is advantageously a biocompatible fatty ester (for example Dragoxat®).

As regards the precursor of the microcapsule membrane contained in the third fluid f3, advantageously a cross-linking agent is chosen, for example terephthaloyl chloride (1,4-benzenedicarbonyl chloride) which is in particular a monomer of Kelvar®. Precursor is taken to mean any compound, which by chemical reaction, in particular cross-linking, makes it possible to form the membrane. Interfacial cross-linking is in fact particularly preferred here, since it is known that it lasts exactly as long as the third fluid f3 and the first fluid f1 to be encapsulated are in contact.

In order that this contact lasts sufficiently long so that a solid membrane imprisoning the microdroplet is formed, the microsystem 10 advantageously comprises a cross-linking coil 14 extending the microchannel 11. Said coil 14 is quite simply an extension of the microchannel 11, folded back on itself to save space, because its length can attain several tens of centimeters whereas the widths of the different microchannels are of the order of one hundred or so microns.

Even more advantageously, the coil 14 may be replaced or completed by a device for emitting an infrared beam, an ultraviolet beam, or an electron beam, the cross-linking being obtained by irradiation, heat treatment, magnetic excitation, etc., of the microdroplets in contact with the fluid f3. In fact, in a particularly preferred manner the microsystem 10 is made of transparent solidified polydimethylsiloxane (PDMS), it is thus for example possible to irradiate through the coil 14. It will nevertheless be understood that the invention is not limited to any cross-linking method in particular. It is even possible that the first fluid f1 and the third fluid f3 become as one, in other words that the fluid to be encapsulated contains directly the microcapsule membrane precursor, the cross-linking then being activated under the effect of the aforementioned irradiation, heat treatment, magnetic excitation, etc. In this case, the microsystem 10 may have a simple Y shaped structure: a fluid f1+f3 comprising both the liquid to be encapsulated and the membrane precursor is injected into the central microchannel 11, and the second fluid f2 is injected into the set of lateral microchannels 12.

Nevertheless, numerous known encapsulation methods do not require irradiation or even cross-linking, and the invention is not limited to any technique in particular, to any particular membrane precursor.

At the outlet of the microsystem 10, there is a flux of uniform microcapsules, but for which neither the diameter nor the mechanical properties are yet known. No stress is applied yet to these microcapsules, of which it is said that they are non-deformed, compared to what is going to follow.

Deformation of the Microcapsules

During a second step, the deformation of the microcapsules is caused by generating a flow within a capillary 20, the diameter of the capillary 20 being of the same order of magnitude as the calibrated diameter.

Same order of magnitude it taken to mean sufficiently fine so that the microcapsules of the calibrated diameter flowing in the capillary 20 have a notable deformation. Nevertheless, if the first microcapsules produced have a diameter much smaller than the calibrated diameter that it is wished to reach, it may be that they are not deformed. The profile of a non-deformed microcapsule is nevertheless exactly treated like the profile of any deformed microcapsule as will be seen hereafter. The device will react to such a non-deformed microcapsule profile by a rapid increase in the diameter of the microcapsules produced, hence the expected deformation after an initial start-up phase.

In other words, the diameter of the capillary must be chosen as a function of the defined optimal diameter, and is advantageously slightly less than said optimal diameter. It will nevertheless be noted that thanks to edge effects, a microcapsule circulating in a slightly wider capillary 20 will be all the same deformed.

As an example, if microcapsules of a diameter calibrated around 100 µm (i.e. the optimal diameter is 100 µm) are desired, a capillary of 75 µm diameter is particularly suited.

The capillary 20 is advantageously a glass tube of cylindrical section, glass being interesting for its stability (no variation in the diameter) and its optical properties.

In fact, the profile of the microcapsules deformed by the capillary depends on their diameter and their mechanical properties. Studies, in particular the document "Flow of artificial microcapsules in microfluidic channels: A method for determining the elastic properties of the membrane" (Y. Lefebvre, E. Leclerc, D. Barthès-Biesel, J. Walter and F. Edwards-Levy, Physics of fluids 20, 31 Dec. 2008) have shown that the observation of the determination profile could make it possible to determine the modulus of elasticity of the membrane of a microcapsule.

Thus, in a particularly preferred manner, the at least one parameter characteristic of the mechanical properties of a microcapsule is the modulus of elasticity (Gs) of the membrane of the microcapsule.

Those skilled in the art will find in the previously cited document details on the means of deforming the microcapsules. In particular, the capillary 20 is advantageously inserted inside the central microchannel 11. Moreover, the capillary 20 advantageously has an internal diameter comprised between 25 and 150 µm, an external diameter comprised between 300 and 500 µm, and a length comprised between and 100 mm, these dimensions being even more advantageously adapted to the expected calibrated parameters.

At the outlet of the capillary 20, the microcapsules recover their non-deformed state. A reservoir 21 intended for the storage of these microcapsules may be provided.

Acquisition of the Outline

Deforming the microcapsules only has an interest if one can observe them, and more particularly characterise their deformation. The method according to the invention thus comprises a step of observing and acquiring the outline of at least one deformed microcapsule observed by optical acquisition means 30.

These optical acquisition means 30, represented in FIG. 3, comprise for example an inverted to microscope and a high speed CCD camera (150 images per second, shutter speed below a millisecond), which being mounted so as to observe the microcapsules through the capillary 20. It is possible to add a light source under the capillary 20. The camera is connected to data processing means 40 (for example the processor of a computer) via an acquisition graphics card (for example a Matrox® METEOR2-MC2), the data processing means 40 being potentially coupled to storage means (such as a hard disc).

This step of acquiring the outline of at least one deformed microcapsule then comprises the taking of at least one photograph of said microcapsule by the optical acquisition means 30: a photograph of the type of those represented by FIGS. 5*a* to 5*f* is obtained, transmitted in digital form to the data processing means 40, and if needs be stored in the storage means.

As may be seen in these figures, the outline of the deformed microcapsule is clearly visible: the points of the outline correspond to the points where the contrast (and more precisely the morphological gradient) is the highest. The acquisition of this outline is possible via numerous known image processing computer tools, for example Image J software, which have suitable algorithms that the data processing means are going to implement. For example, segment algorithms of "watershed" type may be cited.

Figure 6:
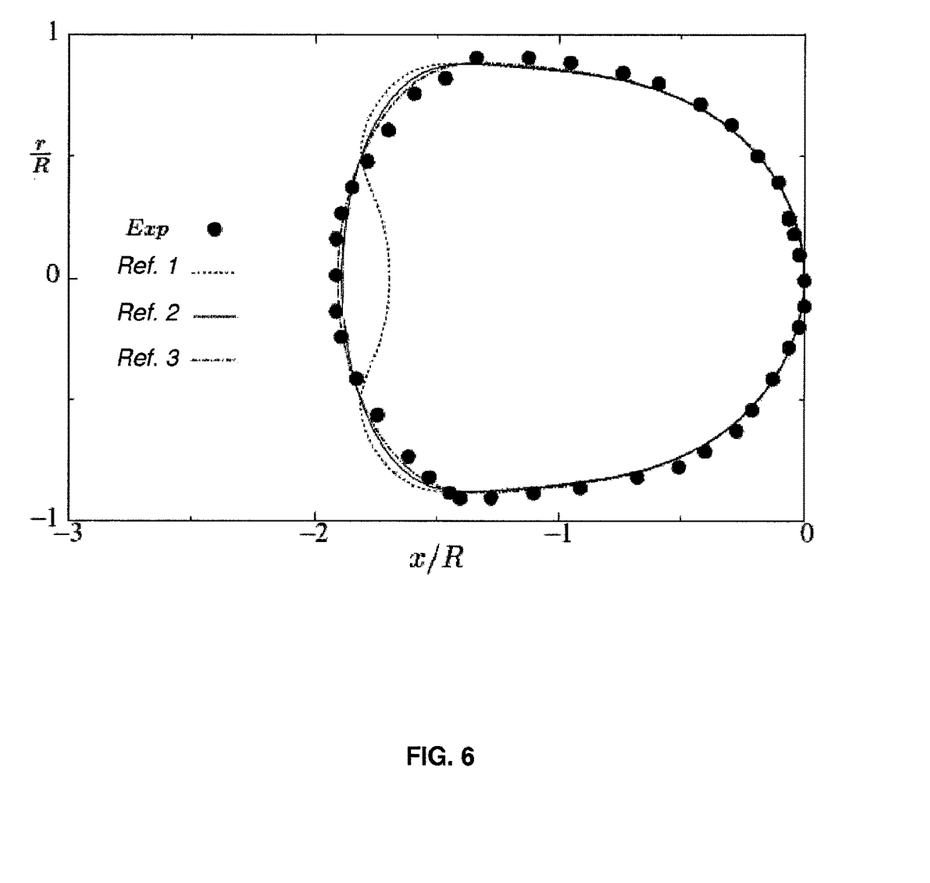
FIG. 6 illustrates the comparison between an observed deformed microcapsule outline, and a reference deformed microcapsule outline.

The acquired outline is then advantageously supplied in the form of a plurality of points, advantageously 30 to 50, materialising the membrane of the microcapsule, isolated and placed on said photograph during its processing by the software. Such an example of acquired outline is represented in FIG. 6. The coordinates of the points are here measured in an orthonormal coordinate system where the X axis is the axis of the capillary 20, the point (0,0) corresponding by convention to the forward-most point of the deformed microcapsule, and the straight lines Y=1 and Y=−1 at the edges of the capillary 20.

In a particularly preferred manner, a second photograph of the observed deformed microcapsule is taken. In fact, knowing the number of images acquired per second by the optical acquisition means 30, one knows what is the time that separates two successive takes (6.67 ms in the case of a 150 frames/s camera). It is possible to deduce therefrom the flow speed in the capillary 20 of the observed microcapsule by calculating the distance covered during photographs.

This comparison is also carried out by the data processing means 40, optionally also thanks to the Image J software, by pinpointing a same singular point of the deformed microcapsule on the two photos, and by measuring the displacement of this point.

As regards the frequency of implementation of this step of observing and acquiring the outline, the invention is not limited to any diagram in particular, but it is desirable that a deformed microcapsule is regularly observed in order to be able to monitor potential variations.

In a particularly preferred manner, the outline acquisition step is implemented for each microcapsule produced by the microsystem 10. This guarantees a perfect control.

Comparison and Determination of the Parameters of the Observed Microcapsule

The outline acquired at the preceding step is then processed, and in particular compared with outlines from a collection of reference microcapsule outlines, the diameter and at least one parameter characteristic of the mechanical properties of a reference microcapsule being known for each reference microcapsule.

It should be noted that the parameter characteristic of the mechanical properties of a known reference microcapsule for each reference microcapsule is not necessarily the same parameter as the parameter characteristic of the mechanical properties of a microcapsule that it is sought to calibrate. Those skilled in the art will know how to use advantageously the relations existing between the different mechanical properties as a function of the behaviour law followed by the material.

It may moreover be interesting to work with dimensionless quantities. In particular, if the parameter that one seeks to quantify is the modulus of elasticity Gs, one may advantageously quantify the capillary number Ca instead. This is a dimensionless number defined by Ca=μV/Gs, where μ and V are the viscosity of the carrier fluid and the speed of the capsule. By determining the value of Ca, Gs may be found, as will be seen hereafter.

This comparison also makes it possible to determine the diameter and the parameter characteristic of the mechanical properties of the observed microcapsule thanks to a principle known as reverse analysis, that we will explain before describing more in detail how the steps of comparing and determining parameters are implemented.

Reverse Analysis

Reverse analysis corresponds to the reverse approach to the direct problem: instead of trying to find the function which, from a measured deformation, supplies us with the parameters of the deformed microcapsule, one is going quite the opposite, from given parameters, to measure the response, in other words the associated deformation.

In our case, a data base, which is the collection of reference microcapsule outlines, gives us a certain number of deformations. The possibility of determining in a unique manner the parameters of a microcapsule by reverse analysis stems from the fact that two different couples (d,Gs) cannot lead to exactly the same deformation. This is why if two microcapsules have the same deformation, it is that they have the same parameters. And thus if a microcapsule has the same deformation as a reference microcapsule, it is that its parameters are those of the reference microcapsule.

This method of reverse analysis, which makes it possible to relate back to the mechanical properties of the membrane, is described in "Comparison between measurements of elasticity and free amino group content for ovalbumin microcapsule membrane: discrimination of the cross-linking degree" (T. X. Chu, A. V. Salsac, Eric Leclerc, Dominique Barthès-Biesel, Hélène Wurtz, Florence Edwards-Lévy, 3 Sep. 2010).

Implementation of Reverse Analysis

The step of comparing the acquired outline with a collection of reference microcapsule outlines deformed by said capillary 20 consists advantageously in the superposition of points of the outline of the microcapsule acquired with each reference deformed microcapsule outline, as may be seen in FIG. 6. Naturally, the outlines will be represented in the same coordinate system, particular the orthonormal coordinate system cited above.

If in particular, as has been stated above, each reference outline is associated in a data base with a couple (d, Gs) then according to a first embodiment the comparison may be made with each outline of the collection, and the diameter and the value of at least one parameter characteristic of the mechanical properties of the observed microcapsule are determined by the data processing means 40 as being those associated with the reference microcapsule(s) whose outline comes nearest to said plurality of points.

It should be noted that the flow speed (it has been shown previously how to calculate it) is a parameter other than d and Gs which can have an incidence on the deformation. This is why it is advantageously taken into account during the step of comparing the acquired outline with the outlines from a collection of reference microcapsule outlines, and quite particularly if each reference outline is associated in a data base with a couple (d, Ca). Gs may be deduced easily with the formula Gs=μV/Ca.

Alternatively, according to a second preferred embodiment, only the reference outlines corresponding to microcapsules of diameter similar to that of the observed microcapsules are taken into account during the comparison step. Only the parameter characteristic of the mechanical properties of the observed microcapsule is then determined thanks to reverse analysis. This implies nevertheless that the diameter of the observed microcapsule can be directly calculated from the acquired outline.

It is in fact possible by making the hypothesis that the deformed microcapsule is perfectly axisymmetrical (in other words that its volume can be reconstructed by carrying out a rotation of the acquired outline around the central axis of the capillary 20). It is thereby possible to calculate the volume of the microcapsule from the acquired outline by integration on the semi-outline of the unit volume associated with each cylindrical section of thickness dx of the deformed microcapsule along the axis of the capillary 20.

$$\text{Knowing the volume vol, } d = 2 \times \sqrt[3]{(3\text{vol}/4\Pi)}$$

The identification from which of a plurality of known reference outline(s) the acquired outline comes closest is carried out by a "fitting" step (adjustment) implemented by means of the data processing means 40 (which can be the same as those used previously, or instead dedicated means).

To do this, an optimisation method is used. For example the "distance" may be determined in the mathematical sense between the plurality of points and each reference microcapsule outline.

In fact, it is possible to project orthogonally each point on the outline with which the comparison is made, to deduce therefrom the distance between the point and the outline (equal to the distance between the point and its projection), and to define the overall distance as the sum of the distances point by point. If D designates the function which, at a reference microcapsule outline, associates the distance in the sense where it has just been defined with the plurality of points, one obtains in the example of FIG. 6:

$$D(R1) > D(R2) > D(R3)$$

It is thus Ref 3 that is the outline that corresponds the best to Exp, in other words the acquired outline. The previously described software is capable of performing this type of calculation in the processing means 40.

Figure 7:
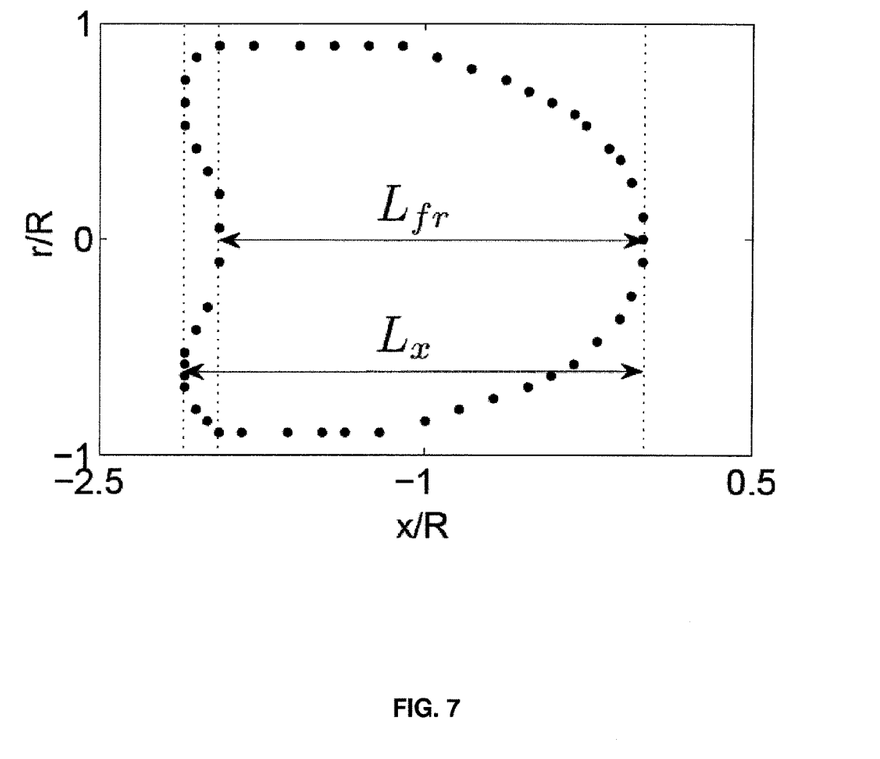
FIG. 7 illustrates quantities characteristic of a deformed microcapsule outline.
Figure 8A:
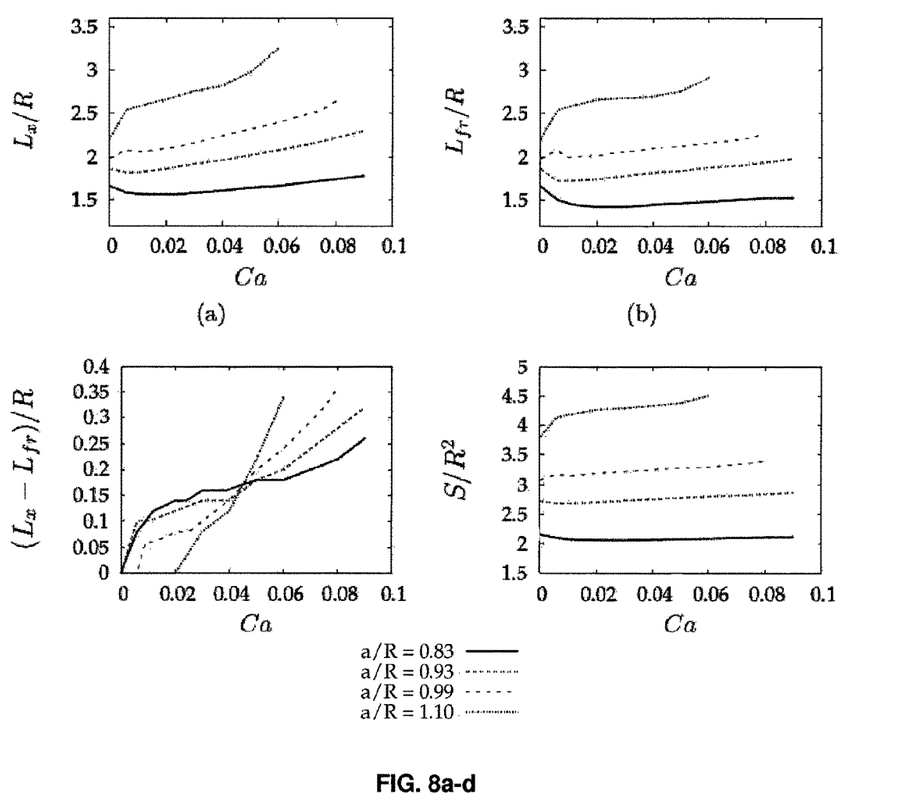

In a preferred manner, the fitting step is performed on dimensionless geometric quantities, for example $L_x/R$, $L_{fr}/R$, $(L_x-L_{fr})/R$, $S/R^2$ that can be calculated from the deformed outline (see FIG. 7). These quantities make it possible to completely characterise an outline. One searches in the data base the reference outline for which the dimensionless geometric quantities are all similar to the values associated with the experimental profile, for example the optimum, in other words the reference outline having the least difference on average with the mentioned dimensionless quantities.

As an example, FIGS. 8a-d show the evolution of the reference, dimensionless geometric quantities as a function of the capillary number.

Alternatively, rather than seek the optimum (in other words the unique reference outline during the fitting), it is possible to apply tolerances on each of the dimensionless geometric quantities. Table 1 below shows particularly preferred values of tolerances used. These tolerances are of the order of magnitude of experimental errors, which stem for example from the blurring of the acquired outlines. It may be remarked that this table comprises an admissible error on a/R (a is the radius of the observed microcapsule, equal to d/2), in other words the error of appreciation of the diameter of the microcapsule if one is in the situation where the comparison is performed only on the outlines of reference microcapsules having a diameter similar to the diameter of the observed microcapsule, determined beforehand as explained previously. It may be noted that the tolerance on this parameter is lower than on the others. This method gives a plurality of admissible reference outlines.

TABLE 1

| Parameters | Tolerance |
|---|---|
| Δ{a/R) (%) | 2 |
| Δ(L$_x$/R) (%) | 4 |
| Δ(L$_{fr}$/R) (%) | 5 |
| Δ(S/R$^2$) (%) | 4 |

The value of the at least one parameter characteristic of the mechanical properties of the observed microcapsule is then determined by the data processing means 40 from those associated with the reference microcapsules of admissible reference is outlines, particularly by taking an average thereof.

The invention is obviously not limited to one of these methods of determining the best fitting outline(s), and those skilled in the art will know how to use any method making it possible to retrace one or more parameters of the observed microcapsule thanks to a collection of reference microcapsules. This method could in particular lead to the identification of one or more admissible outlines, be based on dimensionless quantities characteristic of the outline or on the coordinates of a plurality of points of the outline, and include or not a prior step of determining the diameter by geometric considerations.

Constitution of the collection of reference microcapsule outlines

The collection of reference microcapsule outlines may advantageously be constituted experimentally and/or numerically.

In the first case, the outlines of the reference microcapsules are outlines acquired beforehand by the optical acquisition means 30, the reference microcapsules being deformed by means generating a flow within the same capillary 20.

Either one knows directly the mechanical properties (and thus the value of the parameters characteristic of these mechanical properties) of the microcapsules that are made to circulate in the capillary 20, and consequently the data base is directly informed by associating with the reference outline obtained these parameters (in particular Gs), or one does not know them perfectly.

It is for this second case that it is interesting to choose Ca as parameter characteristic of the mechanical properties of a reference microcapsule. It is in fact a mechanical parameter of the flow in the capillary 20, which can be retraced using fluid mechanics.

Alternatively, one may proceed numerically. This analysis is described for example in the document "QUÉGUINER, C. & BARTHÈS-BIESEL, D. 1997 Axisymmetric motion of capsules through cylindrical channels. J. Fluid Mech. 348, 349-376". This numerical analysis makes it possible to calculate, knowing the geometric parameters of a microcapsule and physical parameters such as the temperature or the radius R of the capillary 20, the dimensionless geometric quantities Lx/R, Lfr/R, (Lx−Lfr)/R, S/R2 (which are represented in FIG. 7) that the outline would have if this microcapsule was deformed by said capillary 20.

The invention is obviously not limited to either of these two techniques, and may in particular exploit data bases constituted beforehand.

It is moreover interesting to have available a collection comprising the largest possible number of reference outlines, so as to be able to carry out a matching as faithful as possible during the comparison step. Those skilled in the art will know how to adapt known models so as to improve as much as possible the quality of the collection.

Adaptation of the Production of Capsules

Once the comparison has been made, one knows as explained what are the diameter and the at least one parameter characteristic of the mechanical properties of the observed microcapsule.

But these parameters do not necessarily correspond to the expected calibrated parameters (known as optimal parameters).

The method according to the invention thus comprises a step of modifying the flow rates Q1, Q2, and/or Q3 of the fluids f1, f2, f3 if the difference between:
  the diameter of the determined observed microcapsule and the optimal diameter, and/or
  the determined value of the at least one parameter characteristic of the mechanical properties of the observed microcapsule and the optimal value of to the at least one parameter characteristic of the mechanical properties of a microcapsule, is above a predetermined threshold, in other words if one is outside of the defined tolerance margins.

Said predetermined threshold is advantageously 10% for the difference between the diameter of the determined observed microcapsule and the optimal diameter, and 30% for the difference between the determined value of the at least one parameter characteristic of the mechanical properties of the observed microcapsule and the optimal value of the at least one parameter characteristic of the mechanical properties of a microcapsule.

Nevertheless, these are only indicative thresholds that those skilled in the art can adapt to the production quality that they desire:

the higher these thresholds, the easier and quicker it is to attain acceptable parameters: this is interesting in the case of a production with high yield in which a precision regarding the value of the parameters is not very important, the lower these thresholds, the more the real parameters of the microcapsules produced will be similar to the expected calibrated parameters, and thus the more the quality increases: this is interesting in cases where the value of the mechanical parameters is crucial, for example precision therapeutic applications. The losses will nevertheless be higher.

The aforementioned parameters have been identified by the applicant as guaranteeing a good balance between yield and quality.

If a correction is necessary, one modifies the flow rates Q1, Q, and/or Q3 of the fluids f1, f2, f3 (it will be seen how hereafter), which immediately has the effect of modifying the parameters of the new lost microcapsules.

The step of modification is repeated until the difference mentioned previously is below the predetermined threshold. The diameter and the at least one parameter characteristic of the mechanical properties of the microcapsules produced is then acceptable. The phase during which the flow rates Q1, Q2, and/or Q3 of the fluids f1, f2, f3 is progressively adapted until the correct values are found is called transitory phase. Depending on the value of the thresholds, this phase will be more or less long, but several minutes usually suffice.

Once the transitory phase is terminated, providing the flow rates Q1, Q2, and/or Q3 of the fluids f1, f2, f3 do not drift (and that external physical parameters such as the temperature do not vary suddenly), the parameters of the microcapsules produced remain constant. It is then no longer theoretically necessary to implement the steps of observation, comparison and modification.

Advantageously, the production is all the same monitored at regular intervals.

Modification of the Flow Rates Q1, Q2, and/or Q3 of the Fluids f1, f2, f3

Several mechanisms are possible. The invention is not limited to any of them and covers any manner of converging towards acceptable microcapsule parameters by modifying the flow rates Q1, Q2, and/or Q3 of the fluids f1, f2, f3

If the size of the microcapsules is too great, advantageously the ratio Q1/Q2 is going to be reduced, in other words decrease Q1 and/or increase Q2.

If the size is too small, one does the opposite.

If Gs does not correspond to the expectations, advantageously the cross-linking parameters are modified. As an example, an increase/decrease of Q3 respectively leads to a reduction/increase in the polymerisation time, in other words an increase/decrease of Gs.

Moreover, it may be remarked that the modification of Q1 can potentially make the pH vary and modify the membrane formation kinetic, hence a modification of Gs.

System of Producing Microcapsules

According to a second aspect, the invention relates to a system of producing calibrated microcapsules, characterised in that it comprises:

a microsystem 10;
a capillary 20;
optical acquisition means 30;
data processing means 40;
the microsystem 10 being adapted to produce microcapsules from a first fluid f1 to be encapsulated injected at a first flow rate Q1, a second fluid f2 not miscible with the first fluid injected at a second flow rate Q2 and a third fluid f3 containing a precursor of the microcapsule membrane injected at a third flow rate Q3;

the system implementing a method according to the first aspect of the invention as described previously.

The invention claimed is:

1. Method for producing microcapsules having a calibrated diameter and at least one calibrated parameter characteristic of the mechanical properties of a microcapsule, method characterised in that it includes the steps of:

producing microcapsules by injecting into a microsystem:
  a first fluid to be encapsulated, at a first flow rate
  a second fluid not miscible with the first fluid, at a second flow rate, and
  a third fluid containing a precursor of the microcapsule membrane, at a third flow rate;

deforming the microcapsules by generating a flow of said microcapsules in a capillary, the diameter of the capillary being of the same order of magnitude as the calibrated diameter, said flow having a flow rate and said diameter being such that said microcapsules are purposely deformed by said flow rate and said diameter;

observing and acquiring the outline of at least one deformed microcapsule within said capillary observed by optical acquisition means;

comparing, by data processing means, the acquired outline with outlines from a collection of reference microcapsule outlines, the diameter and at least one parameter characteristic of the mechanical properties of a reference microcapsule being known for each reference microcapsule;

determining the diameter and the value of the at least one parameter characteristic of the mechanical properties of the observed microcapsule by the data processing means;

modifying the flow rates of the fluids if at least one of:
  the difference between the diameter of the determined observed microcapsule and an optimal diameter is above a predetermined threshold, and
  the difference between the determined value of the at least one parameter characteristic of the mechanical properties of the observed microcapsule and an optimal value of the at least one parameter characteristic of the mechanical properties of a microcapsule, is above a predetermined threshold.

2. Method according to claim 1, wherein the at least one parameter characteristic of the mechanical properties of a microcapsule is the modulus of elasticity of the membrane of the microcapsule.

3. Method according to claim 2, wherein the at least one parameter characteristic of the mechanical properties of a reference microcapsule is the capillary number associated with the reference microcapsule.

4. Method according to claim 1, claim 2 or claim 3, wherein said predetermined threshold is 10% for the difference between the diameter of the determined observed microcapsule and the optimal diameter, and 30% for the difference between the determined value of the at least one parameter characteristic of the mechanical properties of the observed microcapsule and the optimal value of the at least one parameter characteristic of the mechanical properties of a microcapsule.

5. Method according to claim 1, wherein the microsystem comprises a central microchannel, a first set of lateral microchannels and a second set of lateral microchannels, the first fluid being injected into the central microchannel, the second fluid being injected into the first set of lateral microchannels, the third fluid being injected into the second set of lateral microchannels.

6. Method according to claim 5, wherein each microchannel of the first set of lateral microchannels and/or of the second set of lateral microchannels intersects the central microchannel with a same angle comprised between 45° and 90°.

7. Method according to claim 1, wherein the second non miscible fluid is a biocompatible fatty ester.

8. Method according to claim 1, wherein the precursor of the microcapsule membrane contained in the third fluid is a cross-linking agent.

9. Method according to claim 8, wherein the microsystem comprises a cross-linking coil prolonging the microchannel.

10. Method according to one of claim 8 or 9, wherein the cross-linking is obtained by irradiation of the microdroplets in contact with the fluid by an infrared beam, an ultraviolet beam, or an electron beam.

11. Method according to claim 1, wherein the microsystem is made of transparent solidified polydimethylsiloxane.

12. Method according to claim 1, wherein the capillary is a glass tube of cylindrical section.

13. Method according to claim 12, wherein the capillary is inserted inside the central microchannel.

14. Method according to one of claim 12 or 13, wherein the capillary has an internal diameter comprised between 25 and 150 µm, an external diameter comprised between 300 and 500 µm, and a length comprised between 10 and 100 mm.

15. Method according to claim 1, wherein a reservoir for storing microcapsules is placed at the output of the capillary.

16. Method according to claim 1, wherein the step of acquiring the outline of at least one deformed microcapsule comprises the taking of at least one photograph of said microcapsule by the optical acquisition means, the acquired outline being constituted of a plurality of points materialising the membrane of the microcapsule placed on said photograph by the data processing means.

17. Method according to claim 16, wherein the step of acquiring the outline of at least one deformed microcapsule comprises the successive taking of at least two photographs of the microcapsule by the optical acquisition means, said two photographs being compared by the data processing means in order to measure the flow speed in the capillary of the observed microcapsule, said speed being taken into account during the step of comparing the acquired outline with the outlines from a collection of reference microcapsule outlines.

18. Method according to claim 16 or 17, wherein the diameter of the observed microcapsule is directly calculated from the acquired outline, and wherein the step of comparing the acquired outline with a collection of reference microcapsule outlines deformed by said capillary (20) consists in the superposition of the plurality of points acquired with each reference deformed microcapsule outline having a diameter similar to the calculated diameter of the observed microcapsule, the value of the at least one parameter characteristic of the mechanical properties of the observed microcapsule being determined by the data processing means (40) from that associated with the reference microcapsule(s) having a diameter similar to the calculated diameter of the observed microcapsule whose outline comes nearest to said plurality of points.

19. Method according to claim 16 or 17, wherein the step of comparing the acquired outline with a collection of deformed by said reference capillary microcapsule (20) consists outlines in the superposition of the plurality of points acquired with each reference deformed microcapsule outline, the diameter and the value of the at least one parameter characteristic of the mechanical properties of the observed microcapsule being determined by the data processing means (40) from those associated with the reference microcapsules(s) whose outline comes nearest to said plurality of points.

20. Method according to claim 1, wherein the optical acquisition means comprise an inverted microscope and a high speed CCD camera.

21. Method according to claim 1, wherein the outline acquisition step is implemented for each microcapsule produced by the microsystem.

22. Method according to claim 1, wherein the outlines of the reference microcapsules are outlines acquired beforehand by the optical acquisition means, the reference microcapsules being deformed by means generating a flow within the capillary.

* * * * *